July 27, 1943.  O. HAAS ET AL  2,325,508
EXPANDING AND STAKING TOOL
Filed June 24, 1942
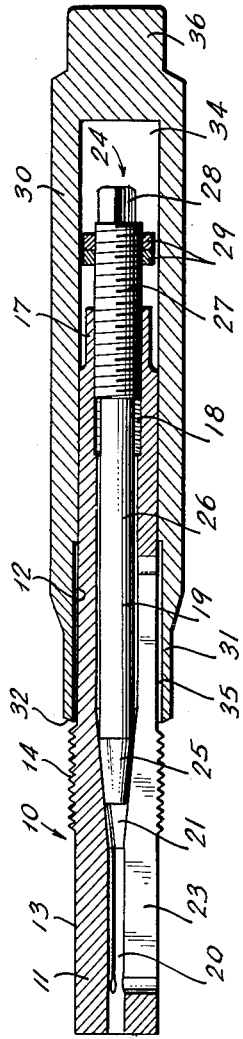
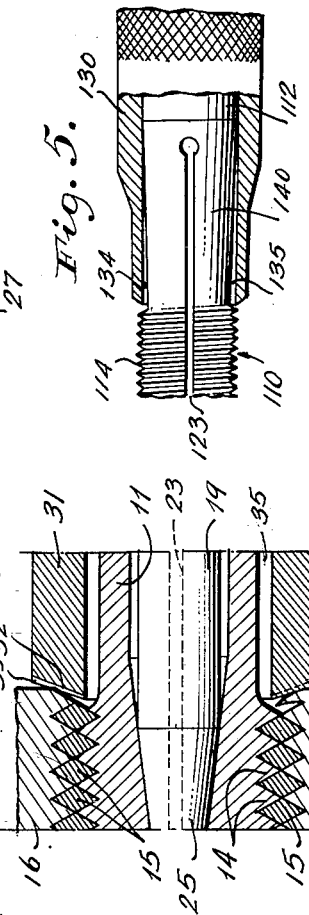
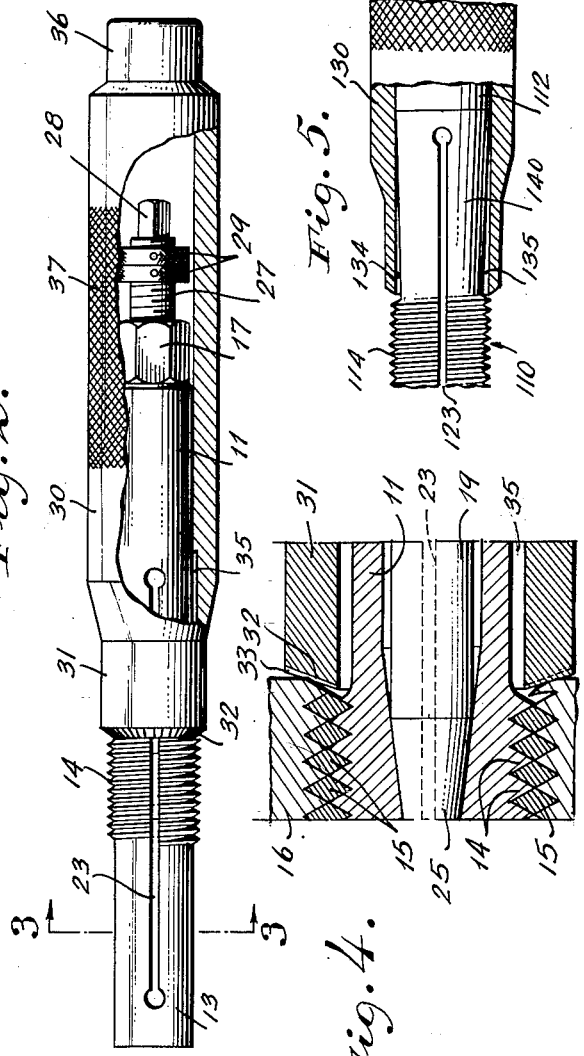
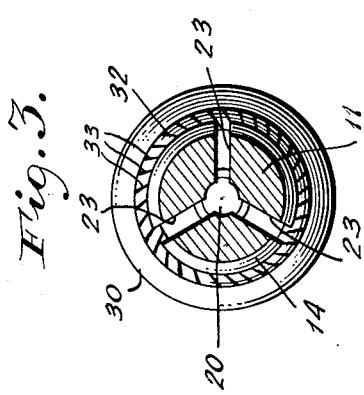
INVENTORS
OTTO HAAS
JAMES RICHARD HAWKINS
BY
ATTORNEY Patented July 27, 1943

2,325,508

UNITED STATES PATENT OFFICE 2,325,508

EXPANDING AND STAKING TOOL

Otto Haas, Richmond Hill, and James Richard Hawkins, Flushing, N. Y., assignors to Aircraft Screw Products Company, Inc., Long Island City, N. Y., a corporation of New York Application June 24, 1942, Serial No. 448,256

9 Claims. (Cl. 10—1)

The invention relates to a tool for use with the lining of threaded holes with wire coil inserts. Such structures require in may cases, that the insert is forcibly expanded into the threading of the hole, and, that it is secured in the member lined with the insert. This can be accomplished in an adequate manner by staking as more fully described in our co-pending application field on the date of the present application. Such staking has the effect of densifying a zone of the material of the member provided with the tapped hole, and also of deforming at least a portion of the threading convolution between the top surface of the member and the top end of the insert coil, which is located a short distance below said top surface.

The invention aims to provide a tool with the aid of which the required expanding and staking operations can be readily performed while the inner portions of the coil convolutions intended to be engaged by a bolt or stud are protected against damage which otherwise may occur during the staking.

The invention consists of a substantially two-part tool, one part of which serving to expand the insert and to hold it in position during the staking, and the other part serving for the staking, wherein said first part constitutes a guide for the second part.

Further objects and details of the invention will be apparent from the description given hereinafter and the accompanying drawing of an embodiment thereof by way of example. In the drawing—

Fig. 1 is a longitudinal section of the combined tool according to the invention.

Fig. 2 is a side elevation, a portion of the second part of the tool being broken away.

Fig. 3 is a section along line 3—3 of Fig. 2.

Fig. 4 is an enlarged section of a lined boss or nut to which the tool is applied, only portions of said boss and tool being shown.

Fig. 5 is a side-elevation, partly in section of a portion of a modified tool.

Referring now to the drawing, the first part of the tool, constituting an expanding device is denoted by 10. It comprises a hollow body 11 having an upper cylindrical portion 12, a lower cylindrical portion 13 and an intermediate threaded portion 14. The threading of a portion 14 has a pitch, cross-sectional shape, and diameter substantially corresponding to the threading formed by the inner portion of a wire coil lining 15 of a tapped hole in a boss member 16, as shown in Fig. 4, which lining is intended to provide the screw helix for engagement by a bolt or stud. The cross-section of the wire of coil 15 in the illustrated embodiment is diamond-shaped. In consequence, the portion 14 is shown with a V-shaped thread. If the tool is to be used for another type of coil wire cross-section, the cross-section of the threading at 14 should be accordingly selected. The outer diameters of the cylindrical portions 12 and 13 are substantially equal to but smaller rather than larger that the smallest thread diameter of the portion 14. The top end of the body 11 is so shaped that a torque can be applied thereto. In the illustrated embodiment the top end is formed as a hexagonal head 17 for this purpose.

The body 11 has a longitudinal bore with an inner threading 18 at the top, a wider cylindrical portion 19, a narrower cylindrical portion 20, and a conical portion 21 between the portions 19 and 20 and located where the threading 14 is provided on the outside of the body 11. The latter is also provided with a plurality of longitudinal slots 23 which extend through the threaded portion 14 and an appreciable distance upward and downward in the portions 12 and 13.

A rod-like member such as an arbor shank 24 is arranged with its major portion interiorly of body 11. The member 24 comprises a cone-shaped end 25, a cylindrical shank 26, a threaded portion 27 and a head 28. The cone 25 is in engagement with the cone face 21, and the threaded portion 27 is in engagement with the internal threading 18. Hence, if a torque is applied to the head 28 relatively to body 11, the member 24 may be screwed inward with the effect that cone 25 spreads the sectors of threaded portion 14 apart. Two lock nuts are indicated at 29 which serve to adjust the depth to which the member 24 can be screwed inward whereby the tool may be used as a gauge for the expansion of the threading 14 and, thus, of the coil 15 to which the tool is applied.

The staking part or punch of the tool is shaped as a substantially cylindrical hollow member 30, whose lower end 31 is reduced in diameter in relation to the main portion of the member 30, and whose upper end constitutes a solid head 36. A portion intermediate the ends is knurled as indicated at 37 for the handling of the tool during its application. The lower end face 32 is the staking face. This face may have any suitable shape; it may be plane, roughened or marked with a design. In the illustrated embodiment, face 32 is beveled and provided with small tooth-like marks or projections 33 in skew form. The diameter of the bore 34 of the upper cylinder portion is so selected that the portion 12 of body 11 fits slidingly therein. However, care is taken that that portion of member 30 which during the staking encompasses part of the slotted portion of member 10, does not obstruct the expansion of the latter. For this reason, the lower portion 35 of the bore of member 30 is somewhat wider than the upper portion 34 in the embodiment of Figs. 1 and 2, but the diameter of portion 35 should not be larger than the outer diameter of the threading 14 in its expanded state.

The modification illustrated in Fig. 5 serves the same purpose. In this figure, parts are denoted with reference numerals one hundred higher than similar parts shown in Figs. 1 and 2. In the modified form, the staking member 130 similar to member 30 in all other respects has a bore 134 of equal diameter throughout its entire inner length. The expanding member 110 has an upper cylindrical portion 112 and a threaded portion 114. An intermediate portion 140 having a length substantially equal to that portion of slots 123 which extends upward from the threading 114, is slightly cone shaped so as to taper from portion 112 to portion 114. Thereby, a clearance 135 is provided to allow for the expansion of member 110.

The combined tool may be used in the following manner: First, the member 30 is removed from body 11. The lock nuts 29 are to be so set that the portion 14 will be expanded the desired amount when the lower nut 29 engages the top surface of head 17. Then, the member 24 is retracted by screwing it outward until the portion 14 is in its contracted position. Thereafter, the body 11 may be applied to an insert coil 15 as shown in Fig. 4 and screwed into the latter until the top convolutions of the coil and of the tool portion 14 are substantially in registry. While body 11 is held in this position, the member 24 may be screwed inward until the lower nut 29 bears on head 17. Thereby, portion 14 will be expanded and the convolutions of the coil 15 will be firmly embedded in the threading of the boss or nut 16 lined by the coil. Then, the member 30 may be slipped over the body portion 12 and punched down so that its surface 32 stakes a ring zone of the top surface of the lined member 16.

In this operation, the member 30 is accurately guided by the body 11. Furthermore, the pressure of the portion 14 acting radially on the convolutions of the coil 15 prevents particularly the top convolution from being urged inward by the staking force. Also, the convolutions of the threading 14 in engagement with the coil convolutions protect those inner portions of the latter against damage during the staking, which are intended to be used as the female threading for a bolt or stud. When the staking is completed, the coil 15 will be safely secured in member 16 owing to the pressure set up between these two parts and particularly owing to the fact that the staking will have deformed the threading of member 16 between its top surface and the top end of coil 15.

It has been stated that the body portion 12 has a sliding fit in the bore 34. In consequence, the air entrapped in the chamber formed by the upper portion of the bore 34 when member 30 is applied to body 11, can escape only through that little clearance which is left between the portion 12 and the inner wall of member 30. The air cushion thus formed in the upper portion of bore 34 prevents the face 32 from forcibly hitting and, thereby, injuring the threading of portion 14 which otherwise may happen owing to inadvertence when the tool is not in use. By adjusting the tightness of the fit between the member 30 and portion 12, i. e., the resistance to the escaping air, the effect of the said air cushion can be adapted to the requirements.

It will be clear that the tool according to our invention is applicable also for staking an annular zone around a lined hole of a member, in which the lining is a structure other than a wire coil, provided that the profile of the portion 14 of the tool is shaped according to the inner profile of such lining.

It will be apparent to those skilled in the art that many alterations and modifications of the tool described and illustrated by way of example are possible within the spirit of our invention which shall be limited therefore only by the scope of the appended claims.

We claim:

1. An expanding and staking tool comprising in co-axial arrangement an expansible hollow first member having a conical inner face portion and a cylindrical outer face portion, a rod-like second member projecting into said first member, said second member having a conical portion in engagement with said conical face portion, a screw connection between said members whereby said second member is axially shiftable with respect to said first member so as to cause expansion of the latter, and a removable cylindrical hollow punch fitting over said first member and having an annular staking surface and an inner guiding surface for engagement with said cylindrical outer face portion of said first member.

2. An expanding and staking tool comprising in co-axial arrangement an inner expansible device and a removable outer staking punch; said expansible device including a hollow member having an upper cylindrical portion and a lower expansible portion, said device further including means interiorly of said member to expand said expansible portion, and said staking punch having an annular staking surface at its lower end and having an inner cylindrical surface slidingly fitting the upper cylindrical portion of said member.

3. An expanding and staking tool comprising in co-axial arrangement an inner expansible device and a removable outer staking punch, said expansible device including a hollow member having an upper cylindrical portion and a lower expansible portion provided with an external threading corresponding to the convolutions of a wire coil intended to be expanded with the aid of the tool, said device further including means interiorly of said member and operative at the top end thereof to expand said lower expansible portion, and said punch having an annular staking surface at its lower end and having an inner cylindrical surface slidingly fitting the upper cylindrical portion of said member.

4. A tool as claimed in claim 3 wherein the inner diameter of said staking surface of said punch is slightly larger than the inner diameter but not larger than the outer diameter of the threading of the expansible portion of said member when said portion is expanded to its desired size.

5. A tool as claimed in claim 3 wherein said staking punch has an upper bore portion fitting said upper cylindrical portion of said member, and a lower bore slightly wider to allow for the expansion of the lower portion of said member.

6. A tool as claimed in claim 3 wherein said member has a slightly conical portion intermediate said upper cylindrical portion and said external threading, said conical portion tapering from said cylindrical portion to said threading in the range of said expansible portion.

7. A tool as claimed in claim 3 wherein the staking surface of said punch is beveled and provided with tooth-like projections.

8. A tool as claimed in claim 3 wherein said punch is provided with a solid head so as to form a chamber for an air cushion between said head and the top of said expanding device.

9. An expanding and staking tool comprising in co-axial arrangement an expansible hollow first member having a conical inner face in its lower portion and a cylindrical and interiorly threaded upper portion, a second member projecting into said first member from its top, said second member having a conical portion in engagement with said conical face and a threaded portion in engagement with the threaded portion of said first member, adjustable means to gauge the expansion of said first member by limiting the depth to which the second member can be advanced, and a removable cylindrical hollow punch fitting over said upper portion of said first member, said second member and said means, said punch having an annular staking surface and an inner guiding surface for engagement with said cylindrical outer surface of said first member.

OTTO HAAS.
JAMES RICHARD HAWKINS.